United States Patent [19]

Mishima et al.

[11] Patent Number: 5,798,414
[45] Date of Patent: Aug. 25, 1998

[54] RESIN COMPOSITION EXCELLENT IN IMPACT STRENGTH

[75] Inventors: Ikuhiro Mishima, Kakogawa; Norito Doi; Youichi Matsumura, both of Takasago; Shigemi Matsumoto, Akashi, all of Japan

[73] Assignee: Kanegafuchi Kagaku Kogyo Kabushiki Kaisha, Osaka-fu, Japan

[21] Appl. No.: 656,295

[22] PCT Filed: Nov. 2, 1996

[86] PCT No.: PCT/JP95/02243

§ 371 Date: Jun. 13, 1996

§ 102(e) Date: Jun. 13, 1996

[87] PCT Pub. No.: WO96/15188

PCT Pub. Date: May 23, 1996

[30] Foreign Application Priority Data

Nov. 15, 1994 [JP] Japan ..................... 6-306779
Nov. 15, 1994 [JP] Japan ..................... 6-306780

[51] Int. Cl.⁶ .................................... C08L 51/04
[52] U.S. Cl. ................. 525/77; 525/70; 525/71; 525/78; 525/80

[58] Field of Search ................. 525/71, 77, 78, 525/80, 70

[56] References Cited

U.S. PATENT DOCUMENTS 4,009,227 2/1977 Ott ............................ 525/71
5,283,287 2/1994 Kim ........................... 525/86

FOREIGN PATENT DOCUMENTS 62-199645 9/1987 Japan.

Primary Examiner—Fred Zitomer
Attorney, Agent, or Firm—Armstrong, Westerman, Hattori, McLeland & Naughton

[57] ABSTRACT

A resin composition is disclosed, which comprizes (I) a graft copolymer using a medium-size rubber particles grown by an acid-group-containing latex, (II) a graft copolymer using small-size rubber particles, (III) a styrene-acrylonitrile copolymer, and/or (IV) a styrene-maleimide copolymer, said resin composition containing 5–40 weight % of rubber. The resin composition is not only superior in impact strength, planar impact strength in particular and gloss, but is favorable in moldability and heat resistance.

2 Claims, No Drawings

5,798,414

RESIN COMPOSITION EXCELLENT IN IMPACT STRENGTH

TECHNICAL FIELD

The present invention relates to a resin composition excelled in impact strength, planar impact strength in particular, moldability, heat resistance (heat distortion resistance) and surface gloss.

BACKGROUND ART

Alloys of acrylonitrile-styrene-(α-methylstyrene)-(phenylmaleimide) copolymers and graft-copolymers made by grafting acrylonitrile and styrene to polybutadiene are generally called ABS resins and are widely used for their excellent moldability et cetera. When heat resistance is especially demanded, α-methylstyrene-copolymerized ABS resins or maleimide-copolymerized ABS resins are used lately.

In the field of home electric appliances which are known as a main source of demand for ABS resins, there has been a strong desire for high-gloss materials which are known to impart added values to such products.

The physical properties of ABS resins depend largely on such factors as resin composition, molecular weight, and composition, gel content, particle size, particle size distribution and content of the incorporated rubber. For the desired high-gloss feature, it is known to be effective to decrease the rubber content as well as its particle size but it is accompanied by such problems as deterioration of impact strength and mechanical properties known as features of ABS resins. Heat resistance of ABS resins is improved by copolymerization of α-methylstyrene or maleimide but this, in turn, causes lowering of impact strength.

In paying attention to the significance of rubber particle size distribution, attempts have been made to use various rubbery polymers for improving gloss with positive preservation of impact strength.

For example, joint use of a small particle size rubber and a large particle size rubber proposed in ① Japanese Laid-open Patent Publication No. 144747/'75, joint use of a low-gel small particle size rubber and a high-gel medium particle size rubber proposed in ② Japanese Laid-open Patent Publication No. 11713/'87, use of rubber of a given particle size distribution with majority of rubber particles being fine proposed in ③ Japanese Laid-open Patent Publication No. 264658/'88, joint use of a rubber medium in particle size and rubber large in particle size, a few microns, proposed in ④ Japanese Laid-open Patent Publication No. 232138/'84, use of a graft polymer prepared by simultaneous grafting to a mixture of rubber particles small and medium in size proposed in ⑤ Japanese Laid-open Patent Publication No. 23438/'85 and joint use of low-grafting rate mixture of rubber particles small and medium in size proposed in ⑥ Japanese Laid-open Patent Publication No. 199645/'87.

According to the methods ① and ④, however, it is difficult to sufficiently improve planar impact strength and gloss, while the methods ②, ③, ⑤ and ⑥, being effective in improving Izod impact strength, were low in practical planar impact strength attainable.

After intensive studies for solution of the aforementioned problems about ABS resins, the present inventors have found that the planar impact strength could be improved when rubber particles small and medium in size having given graft parts were present in predetermined ratio, the effect being particularly remarkable when said medium-size rubber particles were those prepared by a given growing method, and thus arrived at the present invention.

DISCLOSURE OF THE INVENTION

The present invention relates to a resin composition excellent in impact strength comprising:

a graft copolymer (I) comprizing a rubber polymer part (A) whose volume average particle size determined by the transmission type electron microscope analysis-image analysis method (TEM method) is 250–800 nm and a graft part (a) whose volume ratio to said rubber copolymer part (A): (a)/(A) is 0.10–0.80, and a graft copolymer (II) comprizing a rubber polymer part (B) whose volume average particle size by the TEM method is 60–160 nm and a graft part (b) whose volume ratio to said rubber copolymer part (B): (b)/(B) is 0.30–1.00, and a copolymer (III) comprizing 15–60 mol % of a vinyl cyanide compound residue, 40–85 mol % of an aromatic vinyl compound residue and 0–30 mol % of a monomer residue copolymerizable therewith (100 mol % in total), and/or a copolymer (IV) comprizing 15–60 mol % of a vinyl cyanide compound residue, 2–45 mol % of a maleimide compound residue, 35–80 mol % of an aromatic vinyl compound residue and 0–30 mol % of a monomer residue copolymerizable therewith (100 mol % in total), wherein the volume ratio of said rubber polymer part (A) to said rubber polymer part (B): A/(A+B) is 0.4–0.9, said rubber polymer parts (A) and (B) are at least one selected from the group consisting of diene-type rubber polymers, olefin-type rubber polymers and acryl-type rubber polymers, said rubber polymer part (A) is a rubber polymer produced by a coagulation growth method by the use of acid group-containing latex (C) prepared by polymerizing 5–25 weight % of at least one of unsaturated acids (c) consisting of acrylic acid, methacrylic acid, itaconic acid and crotonic acid, 5–30 weight % of at least one of alkyl acrylates (d) 1–12 in carbon number of alkyl group, 80–20 weight % of at least one of alkyl methacrylates (e) 1–12 in carbon number of alkyl group, and 0–40 weight % of at least one of other monomers (f) copolymerizable with (c), (d), (e), consisting of aromatic vinyl compounds, compounds having at least two polymerizable functional groups in a molecule and vinyl cyanide compounds, said graft parts (a), (b) are polymers comprizing 15–60 mol % of a vinyl cyanide compound residue, 40–85 mol % of an aromatic vinyl compound residue and 0–30 mol % of a copolymerizable monomer residue (100 mol % in total), the reduction viscosity of methyl ethyl ketone soluble matters (30° C., in N, N-dimethylformamide solution) is 0.3–1.2 dl/g, and the content of said rubber polymer part is 5–40 weight % of the resin composition.

BEST MODES OF PRACTICING THE INVENTION

The present invention will be described below in detail.

The rubber polymer part (A) of the graft copolymer (I) of the present invention is 250–800 nm, and preferably 300–700 nm, in volume average particle size determined by the transmission-type electron microscope analysis-image analysis method (TEM method). If it is in excess of 800 nm, the result will be lowering of gloss and insufficient planar impact strength, while, if it is less than 250 nm, it will result in lowering of impact strength.

With the rubber polymer part (B) of the graft copolymer (II), the volume average particle size determined by the transmission electron microscope-image analysis (TEM method) is desired to be 60–160 nm, preferably 70–140 nm. If it is less than 60 nm, sufficient impact strength will not be expected, and if it is in excess of 160 nm, no sufficient planar impact strength will be hoped for.

Specific examples of the rubber polymer parts (A) and (B) are diene-type rubber polymers such as polybutadiene rubber, styrene-butadiene rubber, acrylonitrile-butadiene rubber, butadiene-acrylic ester rubber and hydrogenated styrene-butadiene rubber, olefin-type polymers such as ethylene-propylene rubber and ethylene-propylene-diene rubber and acryl-type rubber polymers such as polyacrylic ester rubber and ethylene-acrylic ester rubber.

The rubber polymer part (A) is a rubber polymer produced by a coagulation growth method by the use of acid group-containing latex (C) prepared by polymerizing 5–25 weight % of at least one of unsaturated acids (c) consisting of acrylic acid, methacrylic acid, itaconic acid and crotonic acid, 5–30 weight % of at least one of alkyl acrylates (d) 1–12 in carbon number of alkyl group, 80–20 weight % of at least one of alkyl methacrylates (e) 1–12 in carbon number of alkyl group, and 0–40 weight % of at least one of other monomers (f) copolymerizable with (c), (d), (e), consisting of aromatic vinyl compounds, compounds having at least two polymerizable functional groups in a molecule and vinyl cyanide compounds. The rubber polymer part (A) is preferably a rubber polymer made by the coagulation growth method with addition of 0.1–15 weight parts, preferably 0.5–10 weight parts (solid) of the acid group-containing latex (C) per 100 weight parts (solid) of the rubber latex.

As the unsaturated acid (c) used for the preparation of acid group-containing latex (C), there are included acrylic acid, methacrylic acid, itaconic acid and crotonic acid, and there may be used alone or in combination of two or more, but acrylic acid and methacrylic acid are preferable.

As the alkyl acrylate (d), esters of acrylic acid and alcohols having straight-chain or side-chain 1–12 in carbon number are used and there are included methyl acrylate, ethyl acrylate, propyl acrylate, butyl acrylate and 2-ethylhexyl acrylate, preferably those 1–8 in carbon number of alkyl group. These may be used alone or in combination of two or more.

As the alkyl methacrylate (e), esters of methacrylic acid and alcohols having straight-chain or side-chain 1–12 in carbon number and there are included methyl methacrylate, ethyl methacrylate, propyl methacrylate, butyl methacrylate and 2-ethylhexyl methacrylate, preferably those 1–8 in carbon number of alkyl group. These may be used alone or in combination of two or more.

As the monomers (f) copolymerizable with monomers (c), (d), (e), there are included aromatic vinyl compounds such as styrene, α-methylstyrene and p-methylstyrene, and vinyl cyanide compounds such as acrylonitrile and methacrylonitrile, compounds having at least two polymerizable functional groups in a molecule such as aryl methacrylate, polyethylene glycol dimethacrylate, triaryl cyanulate, triaryl isocyanulate and triaryl trimellitate. These may be used alone or in combination of two or more.

In polymerizing acid group-containing latex (C), it is advisable to take the method of first polymerizing the monomer portion (C1) for the formation of a low-Tg copolymer satisfying $-95°$ C.$\leq$Tg$\leq$40° C., preferably $-80°$ C.$\leq$Tg$\leq$30° C., this portion accounting for 5–40 weight %, preferably 8–35 weight % of (C), and then polymerizing the monomer portion (C2) for the formation of a high-Tg copolymer satisfying $-20°$ C.$\geq$Tg$\leq$80° C., preferably $-10°$ C.$\leq$Tg$\leq$70° C., this portion accounting for the residual 95–60 weight %, preferably 92–65 weight %, for the decrease of coagulum formation during production of acid group-containing latex and improved growability.

The proportion of the unsaturated acid (c) to the acid group-containing latex (C) is 5–25 weight %, preferably 8–23 weight %. If it is less than 5 weight %, no substantial growability can be hoped for and, if it is in excess of 25 weight %, formation of coagulated matters and increase of latex viscosity will result although polymerization of the acid group-containing latex is somehow feasible. This method is thus not suited for industrial production.

The residual monomers for the copolymerization with the unsaturated acid (c) are basically alkyl acrylates (d) and alkyl methacrylate (e). The quantity of the alkyl acrylate (d) is 5–30 weight %, preferably 8–28 weight %. If it is less than 5 weight %, growability is decreased, while, if it is in excess of 30 weight %, increased formation of coagulated matters will result during production of the acid group-containing latex. The quantity of the alkyl methacrylate (e) is 80–20 weight %, preferably 75–25 weight %. Outside this range, the growability is lowered. The alkyl methacrylate and the alkyl acrylate are replaceable by other monomers (f) but the recommended quantity is 0–40 weight %, preferably 0–35 weight %. It is not advisable to use them more than 40 weight %, since it results in lowering of growability.

With monomers having at least two polymeric functional groups in a molecule, it is preferred to use those within 0–3 weight %.

The graft copolymer (I) of the present invention is comprised of the rubber polymer part (B) and the graft part (a) whose volume ratio to the rubber polymer part (A): (a)/(A) is 0.10–0.80, preferably 0.15–0.75. The proportion is important with regard to impact strength, which is markedly lowered if the volume ratio (a)/(A) is less than 1.0 or more than 0.80.

The graft copolymer (II) of the present invention is comprised of the rubber polymer part (B) and the graft part (b) whose volume ratio to the rubber polymer part (B): (b)/(B) is 0.30–1.00, preferably 0.35–0.95. The proportion is important with regard to impact strength, which is markedly lowered if the volume ratio (b)/(B) is less than 0.30 or more than 1.00.

The graft parts (a), (b) are both polymers, each comprised of 15–60 mol %, preferably 20–55 mol % of a vinyl cyanide compound residue, 40–85 mol %, preferably 45–80 mol % of an aromatic vinyl compound residue and 0–30 mol %, preferably 0–20 mol % (100 mol % in total) of a monomer residue copolymerizable therewith.

If the composition of (a) or (b) is outside the aforementioned ranges, the impact strength and moldability of the resin composition of the present invention are lowered markedly.

With the graft part (a) or (b), the vinyl cyanide compound residues are residues of acrylonitrile and methacrylonitrile and the aromatic vinyl compound residues are of styrene, α-methylstyrene, p-methylstyrene, chlorostyrene, bromostyrene and vinyl naphthalene. These may be one or a combination of two or more. From the industrial point of view, the vinyl cyanide compound residue is preferably acrylonitrile and the aromatic vinyl compound residue is preferably styrene residue. As the copolymerizable monomer residues, there are included residues of (meth)acrylic acid, (meth)acrylic ester-type compounds such as methyl (meth)acrylate, ethyl (meth) acrylate, propyl (meth)acrylate, butyl (meth)acrylate, 2-hydroxyethyl (meth)acrylate, 2-ethylhexyl (meth)acrylate and glycidyl (meth)acrylate, and maleimide-type residues such as maleimide and N-phenylmaleimide.

If the composition is within the scope of the present invention, anything produced by any polymerizing method, or by the use of any initiator, chain transfer agent and/or surfactant may be acceptable.

For example, the graft copolymers (I), (II) may be produced by any known polymerizing method such as bulk-polymerization method, solution polymerization method, bulk-suspension polymerization method, suspension polymerization method, emulsion polymerization method, emulsion-suspension polymerization method and emulsion-bulk polymerization method. Preferred is, however, the emulsion polymerization method for the easiness of controlling a volume ratio of the graft part to the rubber polymer part. As initiators for the polymerization of the graft copolymer, any known kind of initiators such as thermodecamposition type initiators e.g. potassium persulfonate and redox-type initiators such as Fe-reducer-organic peroxide may be used.

Within the scope enabling the control of a volume ratio of the graft part to the rubber polymer part, any known chain transfer agent such as t-dodecyl mercaptan, n-dodecyl mercaptan, α-methylstyrene dimer and terpinolene may be used.

With regard to the polymerization method, any polymerization method may be used if the composition within the range set forth in the present invention is attainable.

For example, for obtaining the graft copolymers (I), (II) of the present invention, the rubber polymers (A), (B) may be simultaneously charged into the same polymerization vessel for polymerizing a mixture of monomers, or the graft copolymers (I), (II) may be produced separately. However, preferred is the latter method since it allows the control of the grafting rate within range of the present invention.

For systematic polymerization of graft copolymers (I), (II) in the same polymerization vessel, it is preferable to first charge the rubber polymer (A) and, after polymerizing a given portion of a mixture of monomers according to the specific surface areas of the rubber polymers (A), (B), to charge the rubber polymer (B) for polymerizing the residue of the monomer mixture.

The copolymer (III) of the present invention is comprized of 15–60 mol %, preferably 20–55 mol % of a vinyl cyanide compound residue, 40–85 mol %, preferably 45–80 mol % of an aromatic vinyl compound residue and 0–30 mol %, preferably 0–20 mol % of a monomer residue copolymerizable therewith (100 mol % in total).

With the copolymer (III) of the present invention, impact strength is low when the content of the vinyl cyanide compound residue is less than 15 mol %, and moldability is deteriorated when it exceeds 60 mol %, moldability is also deteriorated when the content of the aromatic vinyl compound residue is less than 40 mol % and impact strength is lowered when it exceeds 85 mol %. Further, impact strength is low when the monomer residue copolymerizable therewith exceed 30 mol %.

As the vinyl cyanide compound residues for the copolymer (III) of the present invention, there are included residues of acrylonitrile, methacrylonitrile etc. and as the aromatic vinyl compound residues, there are included those of styrene, α-methylstyrene, p-methylstyrene, p-isopropylstyrene, chlorostyrene, bromostyrene, vinyl naphthalene etc. These may be used either alone or in combination of two or more. As the copolymerizable monomer residues, there are included residues of (meth)acrylic acid and (meth)acrylic esters such as methyl (meth)acrylate, ethyl (meth)acrylate, propyl (meth)acrylate, butyl (meth) acrylate, 2-hydroxyethyl (meth)acrylate, 2-ethylhexyl (meth) acrylate and glycidyl (meth)acrylate. These may be either alone or in combination of two or more.

The copolymer (IV) of the present invention is comprized of 15–60 mol %, preferably 20–55 mol %, of a vinyl cyanide compound residue, 2–45 mol %, preferably 5–40 mol %, of a maleimide-type monomer residue, 35–80 mol %, preferably 40–75 mol % of an aromatic vinyl compound residue and 0–30 mol %, preferably 0–20 mol % (100 mol % in total) of monomer residues copolymerizable therewith.

With the copolymer (IV) of the present invention, impact strength is low when the content of the vinyl cyanide compound residue is less than 15 mol %, moldability is deteriorated when it exceeds 60 mol %, heat resistance is lowered when the content of the maleimide-type monomer residue is less than 2 mol %, moldability is deteriorated when it exceeds 45 mol %, moldability is also deteriorated when the content of the aromatic vinyl compound residue is less than 35 mol % and impact strength is lowered when it exceeds 80 mol %. Impact strength is lowered when the content of the copolymerizable monomer residue exceeds 30 mol %.

As the vinyl cyanide compound residues of the copolymer (IV) of the present invention, there are included residues of acrylonitrile and methacrylonitrile and as the aromatic vinyl compound residues, there are included those of styrene, α-methylstyrene, p-methylstyrene, p-isopropylstyrene, chlorostyrene, bromostyrene and vinyl naphthalene. As the maleimide-type monomer residues, there are included residues of maleimide, N-methylmaleimide, N-ethylmaleimide, N-propylmaleimide, N-butylmaleimide, N-phenylmaleimide and N-(p-methylphenyl) maleimide. As the copolymerizable monomer residues, there are included those of (meth)acrylic acid and (meth)acrylic ester-type monomers such as methyl (meth)acrylate, ethyl (meth) acrylate, propyl (meth)acrylate, butyl (meth)acrylate, 2-hydroxyethyl (meth) acrylate, 2-ethylhexyl (meth)acrylate and glycidyl (meth) acrylate. These may be either alone or in combination of two or more, respectively.

The copolymers (III) and (IV) may be produced by any of known bulk-polymerization method, solution polymerization method, bulk-suspension polymerization method, suspension polymerization method, emulsion polymerization method, emulsion-suspension polymerization method, and emulsion-bulk polymerization method.

With the thermoplastic resin composition of the present invention, the reduction viscosity of methyl ethyl ketone-soluble matters (30° C., in N, N-dimethylformamide solution) is 0.3–1.2 dl/g, preferably 0.35–1.0 dl/g, more preferably 0.40–0.9 dl/g. The reduction viscosity is a marker of molecular weight and when it is less than 0.3 dl/g, impact strength is insufficient, and moldability is deteriorated when it exceeds 1.2 dl/g.

The resin composition of the present invention is comprized of the graft copolymer (I), the graft copolymer (II), the copolymer (III) and/or the copolymer (IV) and the content of rubber polymers in the composition is 5–40 weight %, preferably 10–30 weight %. If it is outside this range, impact strength or moldability is deteriorated. The volume ratio of the rubber polymer (A) to (B): A/(A+B) is 0.4–0.9, preferably 0.55–0.85. If the ratio is outside this range, planar impact strength is insufficient.

The resin composition of the present invention can be produced in the form of latex, suspension, slurry, solution, powder, beads, pellets etc. or a combination thereof, although it depends on the method of producing the graft polymers (I), (II) and the copolymers (III), (IV). For the recovery of polymer powder from graft copolymer latex after polymerization, any of the known methods may be used such as first coagulating latex by adding thereto a salt of alkaline earth metals such as calcium chloride, magnesium chloride and magnesium sulfate, a salt of alkaline metals such as sodium chloride and sodium sulfate, inorganic acids or organic acids such as hydrochloric acid, sulfuric acid, phosphoric acid or acetic acid, and then centrifuging and drying. Spray-drying method is also usable.

Such mixture can be kneaded by the use of any of melt kneaders such as a Banbury mixer, a roll mill, a monoaxial extruder and a biaxial extruder.

The resin composition of the present invention can be mixed with well-known antioxidants, heat stabilizers, UV absorbers, pigments, antistatics and lubricants, alone or in combination of two or more. Especially, stabilizers of a phenol-type, sulfur-type, phosphite-type and hindered amine-type, ultraviolet ray absorbers of benzophenone-type and benzotriazole-type, and internal and external lubricants such as organosiloxanes, aliphatic hydrocarbons, esters of higher fatty acids and higher alcohols, amides or bisamides of higher fatty acids and modifications thereof, oligoamides and metallic salts of higher fatty acids etc. are useful as additives for further improving the performance of the resin composition of the present invention as a molding material.

As the phenol-type stabilizers, there are included 1,1,3-tris [2-methyl-4-hydroxy-5-tert-butylphenylbutane, n-octadecyl-3-(3',5'-di-tert-butyl-4-hydroxyphenyl) propionate], tetrakis [methylene-3 (3,5-di-tert-butyl-4-hydroxyphenyl) propionate] methane, triethylene glycol-bis-[3-(3-tert-butyl-5-methyl-4-hydroxyphenyl) propionate], pentaerythritol-tetrakis [3-(3,5-di-tert-butyl-4-hydroxyphenyl) propionate], 2,6-di-tert-butyl-4-methylphenol, 2,2'-methylene-bis (4-methyl-6-tert-butylphenol), 2,2'-methylene-bis (4-ethyl-6-tert-butylphenol) and tris-(3,5-di-tert-butyl-4-hydroxybenzyl)-isocyanulate).

As the sulfur-type stabilizers, there are included 3,3'-thiodipropionic acid, dialkyl-3,3'-thiodipropionate, pentaerythrityl-tetrakis (3-alkylthiopropionate), tetrakis [methylene-3-(alkylthio) propionate] methane and bis [2-methyl-4 (3-alkylthiopropionyloxy)-5-tert-butylphenyl] sulfide.

As the phosphite-type stabilizers, there are included stearyl phenyl phosphite, tris (mono, di, nonylphenyl) phosphite, distearyl pentaerythritol diphosphite, tris (2,4-di-tert-butylphenyl) phosphite, di (2,4-di-tert-butylphenyl) pentaerythtritol diphosphite, tetrakis (2,4-di-tert-butylphenyl) 4,4-diphenylene phosphonite and bis (2,6-di-tert-butyl-4-methylphenyl) pentaerythritol diphosphite.

As the hinderd amine-type stabilizers, there are included dimethy succinate-1-(2-hydroxyethyl)-4-hydroxy-2,2,6,6-tetramethyl piperidine polycondensate, poly {[6-(1,1,3,3-tetramethylbutyl) imino-1,3,5-triadine-2,4-diil] [(2,2,6,6-tetramethyl-4-piperidyl)imino]hexamethylene [(2,2,6,6-tetramethyl-4-piperidyl)imino]} and 2-(3,5-di-t-butyl-4-hydroxybenzyl)-2-n-butyl malonate-bis (1,2,2,6,6-pentamethyl-4-piperidyl).

These stabilizers can be used either alone or in combination of two or more.

As the benzophenone-type or benzotriazole-type ultraviolet ray absorbers, there are included 2,4-hydroxybenzophenone, 2-hydroxy-4-methoxybenzophenone, 2-hydroxy-4-n-octoxybenzophenone, 2-(5-methyl-2-hydroxyphenyl) benzotriazole, 2-(3-t-butyl-5-methyl-2-hydroxyphenyl)-5-chlorobenzotriazole and 2-(3,5-di-t-butyl-2-hydroxyphenyl)-5-chlorobenzotriazole.

As the organopolysiloxanes, there are included polydimethylsiloxane, polydiethylsiloxane and polymethylphenylsiloxane.

As the aliphatic hydrocarbon, there are included synthetic paraffin, polyethylene wax and polypropylene wax.

As the esters of higher fatty acids and higher alcohols, there are included montanic acid esters, stearyl stearate and behenyl behenate.

As amides or bisamides of higher fatty acids, and their modifications, there are included stearic acid amide, ethylene bisstearic acid amide, compounds higher in melting point than bisamide, which are synthesized from a higher fatty acid such as stearic acid, a dicarboxyl acid such as succinic acid and a diamine such as ethylenediamine by dehydration reaction.

As the metallic salts of higher fatty acids, there are included calcium salt, magnesium salt, aluminum salt and cadmium salt of higher fatty acids such as lauric acid, myristic acid, palmitic acid, stearic acid and oleic acid.

These lubricants can be used alone or in combination of two or more.

If it is necessary to meet the required fire retardancy, the resin composition of the present invention may possibly be fortified with such additives as fire retardants of halogen-type or phosphite-type, antimony compounds such as antimony trioxide and silicone compounds such as polydimethyl siloxane, and aluminum compounds such as alumina.

Further, for the improvement of mechanical properties such as modulus of elasticity and heat resistance, reinforcing fibers such as glass fiber and carbon fiber and fillers such as mica, talc, clay and glass beads may as well be used.

Hereinafter, the present invention will be described by way of examples and comparative examples, but it is needless to say that the invention is not limited thereby.

In the following description, "part" means weight part and "%" means weight %, respectively. Abbreviations:

BMA: Butyl methacrylate
BA: Butyl acrylate
St: Styrene
AN: Acrylonitrile
MAA: Methacrylic acid
tDM: Tertiary dodecyl mercaptan
CHP: Cumene hydroperoxide
EDTA: Ethylene diamine tetracetic acid
αS: Alpha-methylstylene
PMI: Phenylmaleimide

EXAMPLES 1–15, COMPARATIVE EXAMPLES 1–18

(1) Production of rubber polymer (B)

The following were charged into a 100-liter polymerization vessel.

Deionized water 280 parts
Potassium persulfate 0.2 part
tDM 0.2 part

Further, the followings were charged after evacuating air inside the polymerization vessel by a vacuum pump.

Sodium oleate 1 part

Sodium rosinate 2 parts

Butadiene 100 parts

The polymerization temperature was raised to 60° C. before starting polymerization. Polymerization was completed 12 hours later and the conversion degree was 96% (B-1).

(2) Production of acid group-containing latex (C):

The followings were charged into a reactor having a stirrer, a reflux condenser, a nitrogen inlet, a monomer inlet and a thermometer.

Deionized water 200 parts

Sodium dioctyl sulfosuccinate 0.3 part (C-1)

Sodium dioctyl sulfosuccinate 0.6 part (C-2)

Sodium dioctyl sulfosuccinate 0.4 part (C-3)

Sodium dioctyl sulfosuccinate 0.6 part (C-4)

Sodium dioctyl sulfosuccinate 0.3 part (C-5)

Sodium formaldehyde sulfoxylate 0.5 part

The temperature inside the reactor was raised in nitrogen current to 70° C. under stirring. After 70° C. was reached the monomers shown in Table 1 were dripped continuously at a uniform rate over 5 hours. Thereafter, stirring was continued for 1 hour until the completion of polymerization and acid group-containing latexes (C-1–C-5) were thus obtained.

TABLE 1

| | | Acid group-containing latexes (C) | | | | |
|---|---|---|---|---|---|---|
| | | C-1 | C-2 | C-3 | C-4 | C-5 |
| 1st stage compounds | BMA | 5 | 20 | — | 5 | 20 |
| | BA | 20 | 5 | 20 | 20 | 5 |
| | St | — | — | 5 | — | — |
| | MAA | — | 2 | 1 | — | 1 |
| | tDM | 0.1 | — | 0.1 | 0.1 | — |
| | CHP | 0.05 | 0.05 | 0.05 | 0.06 | 0.10 |
| 2nd stage compounds | BMA | 60 | 55 | 55 | 60 | 50 |
| | BA | — | 5 | 5 | — | 9 |
| | MAA | 15 | 13 | 14 | 15 | 15 |
| | tDM | 0.2 | — | 0.1 | 0.2 | — |
| | CHP | 0.15 | 0.15 | 0.15 | 0.14 | 0.20 |
| Conversion (%) | | 98 | 99 | 99 | 97 | 98 |
| Characteristics | | | | | | |
| Tg-C1 (°C.) | | −51 | 11 | −29 | −51 | 7 |
| Tg-C2 (°C.) | | 47 | 36 | 37 | 47 | 34 |

(3) Production of rubber polymer (A):

3 parts (solid) of the acid group-containing latex (C) obtained by the aforementioned process (2) in a lump at 60° C. to 100 parts (solid) of the rubber polymer (B) obtained by the aforementioned process (1), stirring was continued for 1 hour to allow growth of the particle size and rubber polymers (A) shown in Table 2 were thus obtained (A-1–A-5).

TABLE 2

| | Rubber Polymer (A) | | | | |
|---|---|---|---|---|---|
| | A-1 | A-2 | A-3 | A-4 | A-5 |
| Rubber Polymer (B) | 100 | 100 | 100 | 100 | 100 |
| Acid group-containing latex | | | | | |
| (C-1) | 3 | — | — | — | — |
| (C-2) | — | 3 | — | — | — |
| (C-3) | — | — | 3 | — | — |

TABLE 2-continued

| | Rubber Polymer (A) | | | | |
|---|---|---|---|---|---|
| | A-1 | A-2 | A-3 | A-4 | A-5 |
| (C-4) | — | — | — | 3 | — |
| (C-5) | — | — | — | — | 3 |

(4) Production of graft copolymer (I):

The followings were charged into a reactor having a stirrer, a reflux condenser, a nitrogen inlet, a monomer inlet and a thermometer.

Deionized water 280 parts

Grown rubber (solid) (See Table 2.)

Sodium formaldehyde sulfoxylate 0.3 part

EDTA 0.01 part

Ferrous sulfate 0.0025 part

The temperature inside the reactor was raised in nitrogen current to 60° C. under stirring. After 60° C. was reached, mixed monomers shown in Table 3 were dripped continuously over 4 hours. Thereafter, stirring was continued at 60° C. for 1 hour until the completion of polymerization and graft polymers shown in Table 3 (I-1–I-9) were thus obtained.

TABLE 3

| | | Graft copolymer (I) | | | | | | | | |
|---|---|---|---|---|---|---|---|---|---|---|
| | | I-1 | I-2 | I-3 | I-4 | I-5 | I-6 | I-7 | I-8 | I-9 |
| Rubber Polymer | A-1 | 65 | — | — | 90 | — | — | — | — | — |
| | A-2 | — | 55 | — | — | 20 | — | — | — | — |
| | A-3 | — | — | 60 | — | — | — | — | — | — |
| | A-4 | — | — | — | — | — | 65 | — | 90 | — |
| | A-5 | — | — | — | — | — | — | 55 | — | 20 |
| Compounds | Amount of monomer | 35 | 45 | 40 | 10 | 80 | 35 | 45 | 10 | 80 |
| | AN mol % | 44 | 46 | 40 | 46 | 40 | 44 | 46 | 46 | 40 |
| | St mol % | 56 | 54 | 60 | 54 | 60 | 56 | 54 | 54 | 60 |
| | CHP | 0.1 | 0.2 | 0.1 | 0.1 | 0.3 | 0.1 | 0.2 | 0.1 | 0.3 |
| Conversion % | | 98 | 98 | 98 | 97 | 99 | 98 | 98 | 97 | 99 |

(5) Production of graft copolymer (II):

The materials shown in Table 4 were charged into the reactor, and the graft copolymers (II) (II-1–II-4) were produced in the same manner as in the graft copolymer (I).

TABLE 4

| | Graft copolymer (II) | | | |
|---|---|---|---|---|
| | II-1 | II-2 | II-3 | II-4 |
| Rubber polymer (B) | 55 | 45 | 80 | 10 |
| Compounds Amount of monomer | 45 | 55 | 20 | 90 |
| AN mol % | 50 | 42 | 40 | 43 |
| St mol % | 50 | 58 | 60 | 57 |
| CHP | 0.2 | 0.2 | 0.1 | 0.3 |
| Conversion % | 98 | 99 | 97 | 99 |

(6) Production of copolymer (III)

The followings were charged into the reactor having a stirrer, a reflux condenser, a nitrogen inlet, a monomer inlet and a thermometer.

Deionized water 250 parts

Sodium dioctylsulfosuccinate 1.0 part
Sodium formaldehyde sulphoxylate 0.5 part
EDTA 0.01 part
Ferrous sulfate 0.0025 part The temperature inside the reactor was raised in nitrogen current to 65° C. under stirring. After 65° C. was reached, the monomers shown in Table 5 were dripped continuously over 6 hours. After polymerization for 1 hour and 3 hours, sodium dioctylsulfosuccinate was added 0.5 part each. After the completion of dripping, stirring was continued for 1 hour at 65° C. until the completion of polymerization and copolymers (III-1–III-3) were thus obtained.

TABLE 5

| | | Copolymer (III) | | |
|---|---|---|---|---|
| | | III-1 | III-2 | III-3 |
| 1st stage compounds | Amount of monomer | 100 | 100 | 72 |
| | AN mol % | 40 | 47 | 3 |
| | St mol % | 60 | 24 | — |
| | αS mol % | — | 29 | 52 |
| | tDM | 0.3 | 0.3 | 0.2 |
| | CHP | 0.2 | 0.3 | — |
| 2nd stage compounds | Amount of monomer | — | — | 28 |
| | AN mol % | — | — | 43 |
| | αS mol % | — | — | 2 |
| | tDM | — | — | 0.1 |
| | CHP | — | — | 0.3 |
| Convertion (%) | | 99 | 98 | 97 |
| Composition analyzed | AN mol % | 39 | 48 | 48 |
| | St mol % | 61 | 25 | — |
| | αS mol % | — | 27 | 52 |

(7) Production of copolymer (IV):

The followings were charged into the reactor having a stirrer, a reflux condenser, a nitrogen inlet, a monomer inlet and a thermometer:

Deionized water 250 parts
Sodium diocrylsulphosuccinate 1.0 part
Sodium formaldehydesulfoxylate 0.5 part
EDTA 0.01 part
Ferrous sulfate 0.0025 part The temperature inside the reactor was raised in nitrogen current to 65° C. After 65° C. was reached, the monomers shown in Table 6 were dripped continuously over 6 hours. After polymerization for 1 hour and 3 hours, sodium dioctylsulfosuccinate was added 0.5 part each. After the completion of dripping, stirring was continued for 1 hour at 65° C. and copolymers (IV-1–IV-3) were thus obtained.

TABLE 6

| | | Copolymer (IV) | | |
|---|---|---|---|---|
| | | IV-1 | IV-2 | IV-3 |
| 1st stage compounds | Amount of monomer | 100 | 100 | 72 |
| | PMI mol % | 14 | 21 | 8 |
| | AN mol % | 36 | 28 | 33 |
| | St mol % | 50 | 51 | 31 |
| | αS mol % | — | — | 12 |
| | tDM | 0.3 | 0.2 | 0.2 |
| | CHP | 0.3 | 0.3 | 0.2 |
| 2nd stage compounds | Amount of monomer | — | — | 15 |
| | AN mol % | — | — | 6 |
| | αS mol % | — | — | 10 |
| | tDM | — | — | 0.05 |
| | CHP | — | — | 0.1 |
| Conversion (%) | | 99 | 98 | 99 |
| Composition analyzed | PMI mol % | 14 | 21 | 8 |
| | AN mol % | 35 | 27 | 38 |
| | St mol % | 51 | 52 | 42 |
| | αS mol % | — | — | 12 |

(8) Production of thermoplastic resin composition

The graft copolymer latexes obtained in (4), (5) and the copolymer latexes obtained in (6), (7) were mixed at the ratios shown in Tables 7 and 8, 0.5 part of a phenol-type stabilizer was added with the subsequent addition of 2 parts of calcium chloride for coagulation. The coagulated slurry was dehydrated and dried and thermoplastic resin powders were thus obtained. The rubber polymer content of the thermoplastic resin compositions was 15 weight % when the copolymer (III) was used and 20 weight % when the copolymer (IV) was used.

Then, 1 part of ethylenebisstearylamide was added to 100 parts of the thermoplastic resin powder thus obtained, followed by uniform blending by Tabata, Ltd. 201 blender. Further, the blended mixture was melt kneaded at 240°–270° C. by Tabata, Ltd. 40 m/ml monoaxial extruder and pellets of the thermoplastic resin composition were thus obtained and supplied to the measurement of characteristics. The results are shown in Tables 7 and 8.

TABLE 7

Compositions and Characteristics of Resin Compositions

| | Compositions charged | | | | | | Volume av. particle size of rubber polymer (nm) | | Volume ratio of rubber polymers (A), (B) | Volume ratio of graft part/ rubber polymer part | | Composition of graft part (mol %) | | Reduction viscosity of MEK soluble matters | Characteristics of resin compositions | | | |
|---|---|---|---|---|---|---|---|---|---|---|---|---|---|---|---|---|---|
| | Graft copolymer (I) | | Graft copolymer (II) | | Copolymer (III) | | | | | | | | | Planar impact strength kgfm | Gloss % | Heat resistance °C. | Moldability nm |
| | Kind | Parts | Kind | Parts | Kind | Parts | (A) | (B) | A/A + B | a/A | b/B | St | AN | | | | | |
| Ex. | | | | | | | | | | | | | | | | | | |
| 1 | I-1 | 16 | II-1 | 8 | III-1 | 76 | 560 | 85 | 0.69 | 0.34 | 0.51 | 57 | 43 | 0.59 | 6.5 | 88 | 94 | 820 |
| 2 | I-1 | 14 | II-1 | 11 | III-1 | 75 | 560 | 85 | 0.58 | 0.34 | 0.51 | 55 | 45 | 0.56 | 6.3 | 90 | 94 | 840 |
| 3 | I-1 | 12 | II-1 | 14 | III-1 | 74 | 560 | 85 | 0.49 | 0.34 | 0.51 | 57 | 43 | 0.61 | 6.2 | 92 | 95 | 810 |
| 4 | I-2 | 19 | II-1 | 8 | III-1 | 73 | 370 | 85 | 0.68 | 0.47 | 0.51 | 53 | 47 | 0.62 | 6.6 | 92 | 95 | 800 |
| 5 | I-3 | 18 | II-1 | 8 | III-1 | 74 | 690 | 85 | 0.67 | 0.40 | 0.51 | 55 | 45 | 0.58 | 6.2 | 86 | 94 | 830 |
| 6 | I-1 | 16 | II-2 | 10 | III-1 | 76 | 560 | 85 | 0.67 | 0.34 | 0.64 | 59 | 41 | 0.60 | 6.6 | 89 | 95 | 820 |
| 7 | I-1 | 16 | II-1 | 8 | III-2 | 76 | 560 | 85 | 0.70 | 0.34 | 0.51 | 58 | 42 | 0.64 | 5.0 | 88 | 101 | 660 |
| 8 | I-1 | 16 | II-1 | 8 | III-3 | 76 | 560 | 85 | 0.67 | 0.34 | 0.51 | 58 | 42 | 0.54 | 4.0 | 89 | 115 | 470 |
| Comp. Ex. | | | | | | | | | | | | | | | | | | |
| 1 | I-1 | 23 | — | — | III-1 | 77 | 560 | — | — | 0.34 | — | 59 | 41 | 0.61 | 4.2 | 77 | 94 | 810 |
| 2 | — | — | II-1 | 27 | III-1 | 73 | — | 85 | — | — | 0.51 | 52 | 48 | 0.59 | 1.8 | 92 | 95 | 820 |
| 3 | I-1 | 7 | II-1 | 19 | III-1 | 74 | 560 | 85 | 0.29 | 0.34 | 0.51 | 53 | 47 | 0.60 | 2.4 | 88 | 95 | 820 |
| 4 | I-1 | 22 | II-1 | 2 | III-1 | 76 | 560 | 85 | 0.95 | 0.34 | 0.51 | 57 | 43 | 0.62 | 4.3 | 78 | 94 | 790 |
| 5 | I-4 | 12 | II-4 | 45 | III-1 | 43 | 550 | 85 | 0.70 | 0.06 | 1.13 | 59 | 42 | 0.64 | 2.2 | 63 | 96 | 780 |
| 6 | I-5 | 53 | II-3 | 6 | III-1 | 41 | 370 | 85 | 0.69 | 0.94 | 0.15 | 61 | 39 | 0.66 | 3.6 | 68 | 95 | 770 |
| 7 | I-1 | 16 | II-3 | 6 | III-1 | 78 | 560 | 85 | 0.69 | 0.34 | 0.14 | 58 | 42 | 0.60 | 3.8 | 72 | 94 | 800 |
| 8 | I-1 | 23 | — | — | III-2 | 77 | 560 | — | — | 0.34 | — | 59 | 41 | 0.64 | 3.4 | 78 | 100 | 650 |
| 9 | I-1 | 23 | — | — | III-3 | 77 | 560 | — | — | 0.34 | — | 58 | 42 | 0.55 | 2.4 | 81 | 115 | 460 |

TABLE 8

Compositions and Characteristics of Resin Compositions

| | Compositions charged | | | | | | Volume av. particle size of rubber polymer (nm) | | Volume ratio of rubber polymers (A), (B) | Volume ratio of graft part/ rubber polymer part | | Composition of graft part (mol %) | | Reduction viscosity of MEK soluble matters | Characteristics of resin compositions | | | |
|---|---|---|---|---|---|---|---|---|---|---|---|---|---|---|---|---|---|---|
| | Graft copolymer (I) | | Graft copolymer (II) | | Copolymer (VI) | | | | | | | | | | Planar impact strength kgfm | Gloss % | Heat resistance °C. | Moldability mm |
| | Kind | Parts | Kind | Parts | Kind | Parts | (A) | (B) | A/A + B | a/A | b/B | St | AN | | | | | |
| Ex. | | | | | | | | | | | | | | | | | | |
| 9 | I-6 | 23 | II-1 | 9 | III-1 | 68 | 380 | 85 | 0.74 | 0.32 | 0.48 | 56 | 44 | 0.61 | 4.7 | 117.4 | 455 | 94 |
| 10 | I-6 | 15 | II-1 | 20 | III-1 | 65 | 380 | 85 | 0.58 | 0.32 | 0.48 | 55 | 45 | 0.58 | 4.5 | 115.2 | 485 | 97 |
| 11 | I-6 | 15 | II-1 | 18 | III-1 | 67 | 380 | 85 | 0.48 | 0.32 | 0.48 | 56 | 44 | 0.62 | 4.4 | 116.8 | 475 | 95 |
| 12 | I-7 | 27 | II-1 | 9 | III-1 | 64 | 550 | 85 | 0.74 | 0.45 | 0.48 | 53 | 47 | 0.63 | 4.5 | 114.7 | 505 | 90 |
| 13 | I-6 | 23 | II-2 | 11 | III-1 | 66 | 380 | 85 | 0.74 | 0.32 | 0.61 | 58 | 42 | 0.62 | 4.8 | 116.1 | 480 | 95 |
| 14 | I-6 | 23 | II-1 | 9 | III-2 | 68 | 380 | 85 | 0.74 | 0.32 | 0.48 | 57 | 43 | 0.65 | 3.7 | 126.2 | 375 | 92 |
| 15 | I-6 | 23 | II-1 | 9 | III-3 | 68 | 380 | 85 | 0.74 | 0.32 | 0.48 | 57 | 43 | 0.56 | 4.4 | 107.6 | 620 | 94 |

TABLE 8-continued

Compositions and Characteristics of Resin Compositions

| | Compositions charged | | | | | | Compositions analyzed | | | | | | | | Characteristics of resin compositions | | | |
|---|---|---|---|---|---|---|---|---|---|---|---|---|---|---|---|---|---|---|
| | | | | | | | Volume av. particle size of rubber polymer (nm) | | Volume ratio of rubber polymers | Volume ratio of graft part/ rubber polymer part | | Composition of graft part (mol %) | | Reduction viscosity of MEK soluble matters | | | | |
| | Graft copolymer (I) | | Graft copolymer (II) | | Copolymer (VI) | | | | | | | | | | Planar impact strength | Gloss | Heat resistance | Moldability |
| | Kind | Parts | Kind | Parts | Kind | Parts | (A) | (B) | A/A+B | a/A | b/B | St | AN | | kgfm | % | °C. | nm |
| Comp. Ex. | | | | | | | | | | | | | | | | | | |
| 10 | I-6 | 30 | — | — | III-1 | 70 | 380 | — | — | 0.32 | — | 58 | 42 | 0.62 | 2.3 | 118.6 | 440 | 85 |
| 11 | — | — | II-1 | 36 | III-1 | 64 | — | 85 | — | — | 0.48 | 51 | 49 | 0.60 | 0.8 | 114.1 | 500 | 97 |
| 12 | I-6 | 9 | II-1 | 25 | III-1 | 66 | 380 | 85 | 0.30 | 0.32 | 0.48 | 53 | 47 | 0.61 | 1.2 | 115.8 | 490 | 94 |
| 13 | I-6 | 29 | II-1 | 2 | III-1 | 69 | 380 | 85 | 0.93 | 0.32 | 0.48 | 58 | 42 | 0.63 | 2.4 | 117.1 | 465 | 86 |
| 14 | I-8 | 17 | II-4 | 50 | III-1 | 33 | 380 | 85 | 0.74 | 0.06 | 1.10 | 59 | 41 | 0.66 | 1.4 | 101.1 | 710 | 93 |
| 15 | I-9 | 75 | II-3 | 6 | III-1 | 19 | 550 | 85 | 0.74 | 0.91 | 0.14 | 61 | 39 | 0.69 | 5.4 | 95.3 | 760 | 90 |
| 16 | I-6 | 23 | II-3 | 6 | III-1 | 71 | 380 | 85 | 0.74 | 0.32 | 0.13 | 59 | 41 | 0.61 | 2.0 | 119.2 | 430 | 91 |
| 17 | I-6 | 30 | — | — | III-2 | 70 | 380 | — | — | 0.32 | — | 59 | 41 | 0.64 | 1.6 | 126.0 | 365 | 86 |
| 18 | I-6 | 30 | — | — | III-3 | 70 | 380 | — | — | 0.32 | — | 58 | 42 | 0.57 | 3.5 | 108.6 | 580 | 84 |

In Tables, Tg, compositions analyzed and characteristics of the resin compositions were measured according to the following methods.

[Tg of copolymer of acid group-containing latex (C)]

Tg of the copolymer was calculated by Fox formula on the basis of a homopolymer Tg given in Polymer Handbook.

[Compositions of copolymer (III) and copolymer (IV)]

Part of the produced latex was coagulated with calcium chloride, dehydrated, dried and pulverized and the composition of the resulting copolymer was determined from the composition of the charged materials and the degree of conversion. The composition thus determined agreed with that of the copolymer obtained by CHN analysis and NMR analysis.

[Measurement of reduction viscosity]

Pellets of the resin composition were dissolved in methyl ethyl ketone, the solution was centrifugally separated and thus methyl ethyl ketone soluble matters of the thermoplastic resin composition were obtained. The soluble matters were taken out, dissolved in N, N-dimethylformaldehyde and the reduction viscosity of 0.3 g/dl solution was measured at 30° C.

[Volume ratio of rubber polymer (A) to rubber polymer (B)]

A/(A+B) was determined from the composition of charged materials and the degree of conversion.

[Volume average particle sizes and volume ratios of rubber polymers]

The volume average particle sizes of the rubber polymer part (A) and the rubber polymer part (B) in the resin composition and the volume ratios of the graft parts to the rubber polymer parts (a/A, b/B) were measured in the following way.

Part of latex of the graft polymer (I) was coagulated with calcium chloride, dehydrated, dried and pulverized. This powder was dissolved in acetone, soluble matters other than the graft copolymer were centrifugally separated and the graft copolymer part was thus obtained. The graft copolymer part was dispersed in acetone and a small amount of this dispersion was added to an epoxy resin, followed by thorough mixing and dispersion. Thereafter, the epoxy resin with the graft copolymer dispersed therein was cured by heating for the preparation of samples for measurement.

Each sample was photographed by a known method (dyeing with osminium tetraoxide, slicing the dyed sample by microtome for preparation of specimens for observation through a transmission type electron microscope). With the 1:20,000 and 1:100,000 microscopic pictures thus taken, image analysis was made by means of Nireco, Ltd. LUZEX II D and the volume average particle size of the rubber polymer part (A) was obtained. (The rubber polymer particles appear dark and the graft part appears white in the picture.) Then the volume ratio (a)/(A) of the rubber polymer (A) to the graft part (a) was obtained.

The volume average particle size of the rubber polymer (B) and the volume ratio (b)/(B) of the rubber polymer part (B) to the graft part (b) of the graft copolymer (II), too, were determined in the same manner.

[Compositions of graft parts (a), (b)]

The compositions of the graft parts (a), (b) were determined from the composition of the materials charged and the degree of conversion. The composition thus specified agreed with the result of confirmation by IR analysis of the graft polymer methyl ethyl ketone-insoluble matters.

[Degree of conversion at the time of polymerization]

The degree of conversion at the time of polymerization was calculated from the concentration of the individual solid matters.

[Characteristics of resin composition]

Impact strength was evaluated as the falling weight impact strength of a plate specimen 100 mm×150 mm×3 mm. Evaluation was made by "50% destruction height× falling weight=50% destruction energy [kgfm]".

Heat resistance (HDT) was evaluated by the heat distortion temperature under load of 18.6 kg/cm$^2$ unit:°C.) (ASTM D-648).

Moldability was evaluated by the resin flow length (unit: mm) in a spiral-shaped mold 3 mm thick under an injection pressure of 1,350 kg/cm$^2$ and at a cylinder temperature of 250° C. by the use of Fanac, Ltd. 100B injection molding machine.

Gloss was evaluated by the 60° reflectance of a plate specimen 100 mm×150 mm×3 mm.

In any of these characteristics higher values are superior.

From the results shown in Tables 7 and 8, it is apparent that the resin compositions of the present invention referred to in Examples 1-15 are particularly excellent in planar impact strength, being also favorable in gloss, heat resistance and moldability.

Possibility of Industrial Utilization:

As stated above, the resin compositions of the present invention are not only superior in planar impact strength and gloss in particular, but is favorable in heat resistance and moldability.

We claim:

1. A resin composition of graft copolymers (I and II) and copolymers (III and IV) excellent in impact strength comprising:

a graft copolymer (I) comprising a rubber polymer part (A) whose volume average particle size determined by the transmission type electron microscope analysis— image analysis method (TEM method) is 250-800 nm and a graft part (a) whose volume ratio to said rubber copolymer part (A): (a)/(A) is 0.10-0.80, and a graft copolymer (II) comprising a rubber polymer part (B) whose volume average particle size by the TEM method is 60-160 nm and a graft part (b) whose volume ratio to said rubber copolymer part (B): (b)/(B) is 0.30-1.00, wherein (i) the volume ratio of said rubber polymer part (A) to said rubber polymer parts (A) plus (B): A/(A+B) is 0.4-0.9, (ii) said rubber polymer parts (A) and (B) are at least one selected from the group consisting of diene rubber polymers, olefin rubber polymers and acryl rubber polymers, (iii) said rubber polymer part (A) is a rubber polymer produced by a coagulation growth method using an acid group-containing latex (C) to control the volume average particle size of a (A) while avoiding substantial formation of coagulates, latex (C) being prepared by polymerizing 5-25 weight % of at least one of unsaturated acids (c) selected from the group consisting of acrylic acid, methacrylic acid, itaconic acid and crotonic acid, 5-30 weight % of at least one of alkyl acrylates (d) 1-12 in carbon number of alkyl group, 80-20 weight % of at least one of alkyl methacrylates (e) 1-12 in carbon number of alkyl group, and 0-40 weight % of at least one of other monomers (f) copolymerizable with (c), (d), (e), consisting of aromatic vinyl compounds, compounds having at least two polymerizable functional groups in a molecule said compounds being selected from the group consisting of aryl methacrylate, polyethylene glycol dimethacrylate, triaryl cyanulate, triaryl isocyanulate and triaryl trimellitate and vinyl cyanide compounds, (iv) said graft parts (a), (b) are polymers comprising 15-60 mol % of a vinyl cyanide compound, 40-85 mol % of an aromatic vinyl compound and 0-30 mol % of a copolymerizable monomer (100 mol % in total), a copolymer (III) comprising 15-60 mol % of a vinyl cyanide compound, 40-85 mol % of an aromatic vinyl compound and 0-30 mol % of a monomer copolymerizable therewith (100 mol % in total), and/or a copolymer (IV) comprising 15-60 mol % of a vinyl cyanide compound, 2-45 mol % of a maleimide compound, 35-80 mol % of an aromatic vinyl compound and 0-30 mol % of a monomer copolymerizable therewith (100 mol % in total), the reduced viscosity of the resin composition of methyl ethyl ketone soluble matters (30° C., in N, N-dimethylformamide solution) is 0.3-1.2 dl/g, and the content of said rubber polymer part is 5-40 weight % of the resin composition.

2. The resin composition according to claim 1, wherein the volume ratio of said rubber polymer part (A) to said rubber polymer part (B): (A)/ is 0.55-0.85 and the volume ratio of said rubber polymer part (A), (B) to said graft part (a), (b): (a)/(A) is 0.15-0.75 and (b)/(B) is 0.35-0.95, respectively.

* * * * *

UNITED STATES PATENT AND TRADEMARK OFFICE
CERTIFICATE OF CORRECTION

PATENT NO.: 5,798,414
DATED : August 25, 1998
INVENTOR(S): MISHIMA et al.

It is certified that error appears in the above-identified patent and that said Letters Patent is hereby corrected as shown below:

On the title page of the patent, item "[22] PCT Filed: Nov. 2, 1996" should be -- [22] PCT Filed: Nov. 2, 1995--.

Signed and Sealed this

Thirtieth Day of November, 1999

Attest:

Attesting Officer

Q. TODD DICKINSON

Acting Commissioner of Patents and Trademarks